United States Patent
Pavlicek et al.

[11] 3,865,494
[45] Feb. 11, 1975

[54] ABSORPTION PHOTOMETER

[75] Inventors: Miroslav Pavlicek; Miroslav Rosenbaum, both of Praha, Czechoslovakia

[73] Assignee: Ustav pro vyzkum rud, Praha, Czechoslovakia

[22] Filed: May 15, 1973

[21] Appl. No.: 360,543

[30] Foreign Application Priority Data
May 16, 1972 Czechoslovakia .................. 3300-72

[52] U.S. Cl. .................................. 356/201, 356/205
[51] Int. Cl. ............................................ G01n 21/24
[58] Field of Search ................... 356/85, 88, 93–95, 356/201, 204–206, 235; 250/575

[56] References Cited
UNITED STATES PATENTS

| | | | |
|---|---|---|---|
| 2,152,645 | 4/1939 | Holven et al. | 356/206 X |
| 3,489,906 | 1/1970 | Beer | 356/206 UX |
| 3,600,091 | 8/1971 | Goleb et al. | 356/85 |

Primary Examiner—Ronald L. Wibert
Assistant Examiner—F. L. Evans

[57] ABSTRACT

A twin beam photometer using a discharge tube, the radiating flux of which is modulated by magnetic means. The photometer selects from this modulated radiating flux two radiating beams, the distance from each other being determined by the amplitude of the radiating flux. Measuring cells are placed in the track of each radiating beam; the radiation from both radiating beams is received in a radiation detector.

6 Claims, 2 Drawing Figures

PATENTED FEB 11 1975　　3,865,494

ABSORPTION PHOTOMETER

BACKGROUND OF THE INVENTION

The invention relates to a twin beam photometer which due to its arrangement and application of new elements may be used, for instance, as a detector of eluates leaving columns operating on the chromatographic principle.

Single beam photometers are generally used for the continuous detection of eluates leaving columns; such photometers, due to the arrangement of their optical parts, can be situated directly on the output of the column. The supply means, conveying the eluates to the measuring cell of the apparatus, must be short in order to limit the blurring of chromatographic waves in the recording device, where the readings of the photometer are recorded. Drawbacks of these single beam apparatuses are mainly that due to the unstable operating conditions of the sources, detectors and evaluating circuits, the results are so erroneous that they frequently cannot be used for quantitative analysis. The relatively long time for heating the apparatus of this type, needed prior to any measurement, frequently also a low sensitivity, limits still more the use of such apparatus for some measurements. All actually designed apparatuses of this kind, particularly if they have to work on wave lengths in the ultraviolet part of the spectrum, do not meet by their arrangement the requirement that their optical part with the measuring cell can be situated as close as possible to the outlet of, for instance, a chromatographic column.

It is an object of this invention to reduce the size of the optical part of the arrangement so that it could be situated for instance directly below a chromatographic column.

It is another object of this invention to provide means which reduces the liability of the apparatus to failures and to eliminate dependence of the results on ageing of the working elements and on fluctuations of operating voltage and temperature.

The arrangement according to this invention comprises a twin beam photometer with a single source of radiation and a single radiation detector with a magnetic modulation having a discharge tube, the cylindrical discharge part of which is at least partly surrounded by a heat protective shield with an opening for the passage of the radiating flux from the discharge tube. Magnetic means is positioned in close proximity to the discharge part of the radiating tube and creating a magnetic flux coabial with the radiating flux from the discharge tube and causing a modulation of the radiating flux from the discharge tube. A number of screens with slots select from the radiating flux two substantially parallel radiating beams, the distance of these slots of the screens being determined by the magnitude of the modulating amplitude of the radiating flux of the discharge tube. A measuring cell is disposed in the track of each of both radiating beams; a radiation detector receives the radiation from both radiating beams.

DESCRIPTION OF PREFERRED EMBODIMENT

Figure 2:
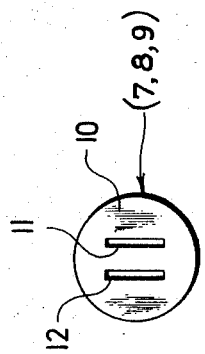
FIG. 2 is a view in elevation of a screen which separates the radiating flux from the discharge tube into two beams.

The optical part of the photometer as shown in the drawing comprises two electromagnets 1 and 2 with open cores the pole shoes of which are opposite one to the other; the exciting coils 3 and 4 of the electromagnets 1 and 2 are connected electrically in opposite directions. A cylindrical part of a D.C. discharge tube 5 and a heat protective shield 6 with an opening which allows the passage of the radiating flux are situated in the space between the pole shoes of electromagnets 1 and 2. The electromagnets 1 and 2 create a magnetic flux coaxial with the axis of the radiating flux from the discharge tube and cause a modulation of this radiating flux. Two radiating beams are selected from the radiating flux by screens 7, 8 and 9 each having a disc-shaped body 10 (FIG. 2) provided with parallel slots 11 and 12. The length of the parallel slots 11 and 12 is determined by the amplitude of the modulated radiating field of the discharge tube 5.

Cells 13 and 14 and an optical filter 15 are provided between the screens 7 and 8, a compensation shield 16 is disposed in the path of one of the radiating beams between the screens 8 and 9. The cell 13 has a fixed light-transmitting effect. Cell 14 contains the compound being investigated, and thus its light-transmitting property differs with different commpounds which it may contain. The radiation detector 17 is situated in the optical axis of the projection system, and its signal is brought to the electronic (amplifier) part 18, where it is amplified and adjusted and as a compensation signal supplied to the electromechanical compensation element 19 connected mechanically with the compensation shield 16. A voltage, the variations of which over a period of time is registered by the recording device 20, is derived from the magnitude of the compensation signal.

Figure 1:
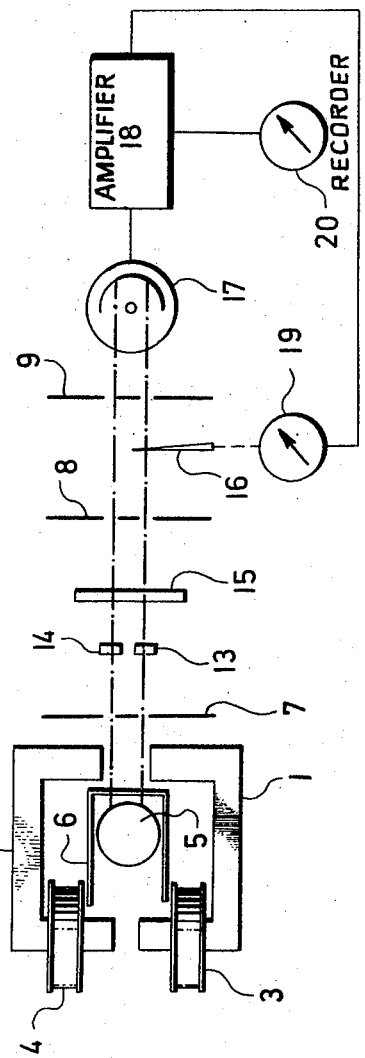
FIG. 1 in the accompanying drawing:
Schematically shows a photometer according to the invention, and includes the wiring diagram therefor.

The compensation shield 16, which is made of wedge shape of translucent material, is automatically advanced in one radiating flux path (the lower one in FIG. 1) by the element 19 to reduce the voltage generated at detector 17 by the two beams to the lowest value. The element 19 is provided with a dial and pointer whereby the degree of advancement of shield 16 into said one beam of flux may be read.

The arrangement according to this invention operates as follows.

Due to the action of the AC magnetic field on the DC discharge of the discharge tube 5 which passes perpendicularly to the AC magnetic field a definite modulation of the radiating flux is achieved, from which radiating flux two radiating beams are separated by the screens 7, 8 and 9. Each of these radiating beams generates on the detector 17 a voltage of the same frequency but of opposite phase, which voltages are added on the input circuits of the amplifier 18. So far these voltages have an equal amplitude, the resulting electric signal at recorder 20 is zero. If the voltages are different, for instance due to light absorption of the investigated component in the measuring cell 14, a differential signal of variable amplitude and phase is generated and a signal of such a time course and polarity is generated on the output circuit of the electronic part 18 capable to operate the element 19 and thus the compensation shield 16 and to reduce this differential voltage again to the lowest value. Thus a feedback compensation effect is secured. The extent of engagement of the compensation shield 16, proportional to the compensation signal, is a measure of the optical density of the investigated component in the measuring cell 14. As the D.C. discharge tube 5 a medium pressure mercury discharge tube is generally suitable.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A photometer comprising an electrical discharge tube as a radiation source, magnetic means provided in close proximity to the discharge part of the discharge tube, creating a magnetic flux coaxial with the radiating flux from the discharge tube, and causing a modulation of the radiating flux, a plurality of screens aligned with slots which select two substantially parallel radiating beams from the radiating flux, a measuring cell in the track of each of both radiating beams, one of said cells being adapted to receive a compound to be investigated, and a detector of radiation receiving the radiation of both radiation beams.

2. A photometer according to claim 1, wherein the electrical discharge tube has a D.C. discharge, and the magnetic means comprises electromagnets operated by alternating current and producing an alternating magnetic field.

3. A photometer according to claim 1 wherein the discharge tube has a cylindrical discharge part, and comprising a heat protective shield at least partly surrounding said discharge part, and an opening of this heat protective shield providing for passage of a radiating flux through the shield.

4. A photometer according to claim 1, wherein each of the screens has two coextensive parallel slots therein, said slots having a length determined by the magnitude of the modulating amplitude of the radiating flux of the discharge tube.

5. A photometer according to claim 1 comprising a compensation shield in the track of one of the radiating beams after the passage of said beam through a measuring cell.

6. A photometer according to claim 5, wherein the compensation shield is graduated in the direction into and away from the said one beam and is movable in a path along said direction, and comprising means causing a compensating movement of the compensation shield in dependence on signals received from the radiation detector.

* * * * *